Figure 1:
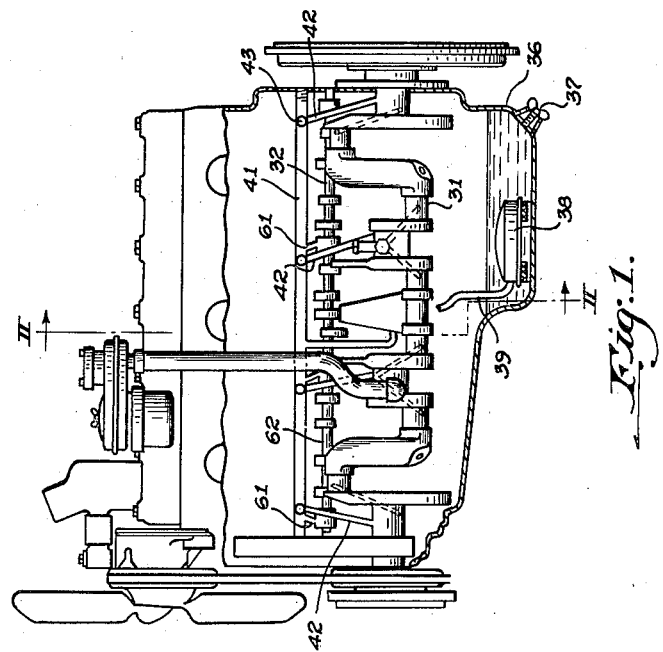

Jan. 3, 1950          B. H. EATON          2,493,120

METHOD OF INTERNALLY CLEANING BEARINGS OF ENGINES

Filed April 3, 1945          2 Sheets-Sheet 1

WITNESSES:
E. J. Maloney.
E. O. Johns

INVENTORS.
Belden H. Eaton
BY
Brown, Critchlow & Flick
ATTORNEYS.

Jan. 3, 1950            B. H. EATON            2,493,120
METHOD OF INTERNALLY CLEANING BEARINGS OF ENGINES
Filed April 3, 1945            2 Sheets-Sheet 2
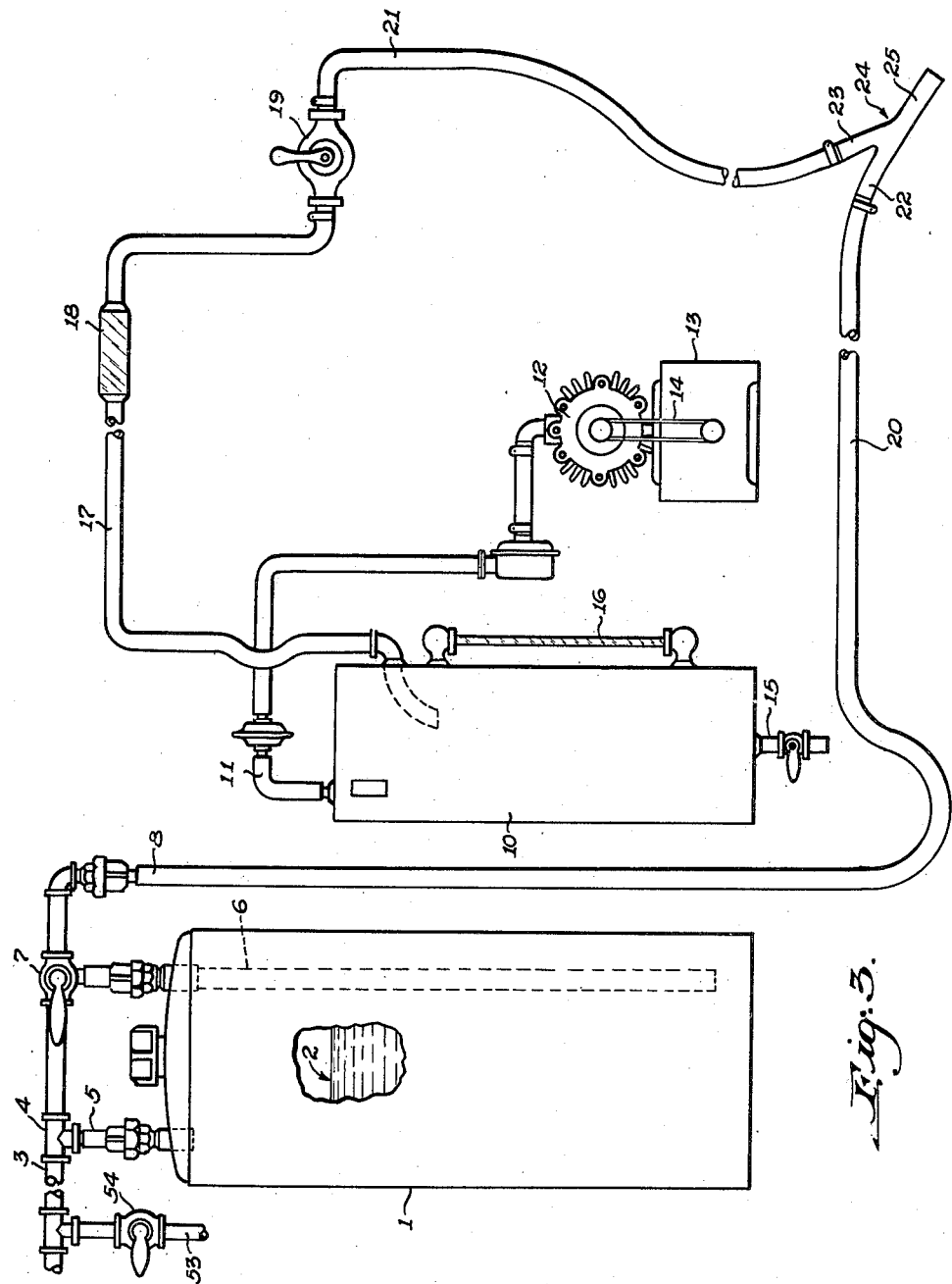

Patented Jan. 3, 1950

2,493,120

UNITED STATES PATENT OFFICE 2,493,120

METHOD OF INTERNALLY CLEANING BEARINGS OF ENGINES

Belden H. Eaton, Allison Park, Pa.

Application April 3, 1945, Serial No. 586,302

5 Claims. (Cl. 134—21)

This invention relates to the internal cleaning of oil ducts and of those relatively movable contacting parts of an internal combustion engine, especially of the automotive type, that are lubricated by oil supplied from a crank case in which it is carried. The relatively movable parts here contemplated include the crank shaft, cam shaft, and other bearings, and pistons and cylinders.

The lubricating oil supplied to these parts becomes contaminated with dust, grit and other foreign matter which is only partially removed by oil and air filters and which lodges in relatively movable parts that have small clearances between them, causes excessive wear of such parts, and at times so clogs the bearings and oil ducts leading to them that the bearings fail for lack of lubrication. This is accentuated by such oxidation of the lubricating oil and sludge formation as takes place.

The object of this invention is to provide a method of effectively removing foreign matter and other lubricating oil contaminants from the relatively moving parts of an internal combustion engine and from the instrumentalities used in supplying lubricating oil to them, whereby the engine is thoroughly cleaned internally.

In engines of the type here contemplated lubricating oil is pumped from a crank case to main and secondary galley lines that extend to the cam shaft, crank shaft and other bearings of the assembly. The internal cleaning of bearings according to this invention is preferably done in two stages. In the first stage the lubricating oil in the crank case is drained from it, and while the crank case plug is removed an oil galley line is repeatedly supplied with a solvent under pressure to force it into the bearings and into or through the oil screen in the crank case, and, alternating with each such application of solvent, air under high pressure is applied to the galley to force the solvent through the bearings and screen and into the crank case, from which it escapes. These alternate applications of solvent and of air under pressure to the galley line and bearings connected to it remove much of the oil from the lubricating system and bearings, and remove substantial amounts of the oil contaminants. It also has the important advantage of cleaning the oil screen that lies in the crank case and through which oil is drawn by the pump for delivery to the galley lines. By thus cleaning it, the oil screen will not collapse or be otherwise impaired during the second stage of the internal cleaning operation.

The alternate application of solvent and air is repeated until the solvent escaping from the crank case appears to contain no contaminants. Each application of solvent should be under a relatively high pressure, for example, about one hundred pounds per square inch, and should be continued for about a minute, or until the solvent has been blown from the galley lines and through the bearings and screen.

After the first stage of the internal cleaning has been completed the galley line is again repeatedly supplied with a solvent under pressure to force it into the bearings, and, after each of these applications of solvent, suction is applied to the galley line to withdraw solvent thus applied to it. During this second stage of cleaning there is maintained a mist of solvent around the exterior of the bearings to seal them during the withdrawal of solvent so that the suction applied to effect the withdrawal will not merely draw air through the bearings. In both the first and second stage of the cleaning, a suitable connection for the applications of solvent, air and suction may advantageously be made to the main oil galley, as for example at its opening for connecting the oil line that leads to the oil gauge.

In the second stage of the cleaning, the mist for sealing the bearings may be formed and maintained in the crank case by supplying the case with a quantity of solvent while the plug is in place, the solvent being atomized to form a mist by upwardly directed jets of compressed air that are applied immediately beneath the surface of the solvent. Also, in this stage of cleaning the intermittently applied bodies of solvent are forced into the lubricating oil ways under a relatively high pressure of about one hundred pounds per square inch, and the suction alternately applied to withdraw it should be as high as can readily be maintained.

By a similar two-stage cleaning procedure the piston oil rings and the adjacent faces of the pistons and cylinders may be cleaned. Each cylinder is cleaned separately, preferably while the piston is at its uppermost position adjacent to the head of the cylinder on the firing stroke. The connection to each cylinder for the repeated and alternate applications of solvent, air and suction may be made to the spark plug port by removing the spark plug.

Figure 2:
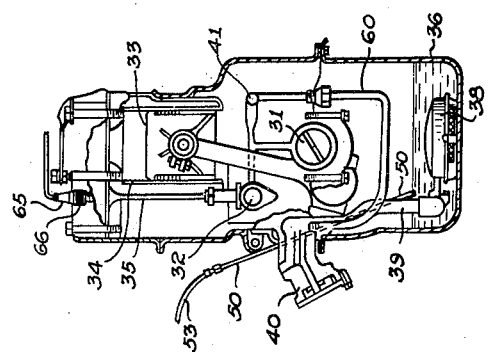

The invention will be further explained with reference to the accompanying drawings in which Fig. 1 is a diagrammatic elevation, partly in vertical section, of an automotive in-line internal combustion engine; Fig. 2 a diagrammatic vertical cross section view of the engine through one of its cylinders, the plane of view being indicated by the broken line II—II, Fig. 1; Fig. 3 a diagrammatic view of equipment that may conveniently be used in the cleaning; and Fig. 4 a longitudinal sectional view of an atomizing tube that may be used for creating a mist of solvent in the crank case.

The cleaning equipment shown in Fig. 3 includes a tank 1 which may have a capacity of about ten gallons and which at the beginning of a cleaning operation is supplied with a suitable oil solvent to about the level indicated at 2. The top of this tank is connected by a pipe 5 through a T-fitting 4 to a compressed air line 3 by which the solvent in the tank is continuously maintained under the high pressure of the line, which, as stated, may be about one hundred pounds per square inch. Extending downwardly through the top of the tank there is a pipe 6 having an open lower end which lies immediately above the bottom of the tank, and having its upper end connected to the compressed air line 3 by a three-way valve 7 whose outlet is connected to a pipe 8.

The equipment also includes a vacuum tank 10 which is connected at its upper end to a pipe 11 that extends to the intake of a rotary vacuum pump 12 adapted to be driven by a motor 13 to which it is connected by a belt 14. The bottom of tank 10 is provided with a valve-controlled drain pipe 15, and its side with a transparent liquid-level observation tube 16. To the upper portion of tank 10 there is connected a pipe 17 that is provided with a transparent section 18 for observation of flow through it and is attached to a control valve 19. A flexible hose 20 is connected to the outer end of pipe 8, and a similar hose 21 is connected to control valve 19. The outer ends of these hoses are connected to branches 22 and 23, respectively, of a Y-fitting 24 which includes a nozzle end 25 adapted to be connected to parts of an engine to effect internal cleaning of it.

The internal combustion engine diagrammatically shown in Figs. 1 and 2 includes a crank shaft 31, a cam shaft 32, pistons 33, cylinders 34, valve actuating rods 35 and a crank case 36 provided with a drain plug 37. In the crank case there is a float-type oil screen 38 which is connected by a pipe 39 to the inlet side of an oil pump 40 whose outlet is connected by a pipe 60 to the main oil galley line 41. From the main galley line 41 auxiliary galley lines 42 extend to the crank shaft bearings for supplying them with lubricating oil, and other auxiliary lines 61 extend to the cam shaft 62 and to rod valve bearings. For registering the pressure on the lubricating oil while the engine is running, a pipe (not shown) extends from a connecting opening 43 in the main galley to an oil gauge.

In internally cleaning the bearings of the engine, plug 37 is removed to drain the oil from the crank case, and nozzle 25 of Y-fitting 24 is attached to and suitably sealed in opening 43 from which the pressure gauge line has been disconnected. Three-way valve 7 is then turned to permit flow of solvent from tank 1 through pipes 6 and 8, flexible hose 20 and the nozzle of fitting 24, the solvent being forced through these lines, under the high air pressure acting upon it in tank 1 through pipe 5. This supply of solvent under pressure flows through the main galley line 41 and the auxiliary lines to the bearings to which they extend, and also through the oil pump to oil screen 38 in the crank case. Because the oil pump is unsealed when stationary, it is not difficult to force solvent through it. When solvent has thus been supplied for about a half minute, three-way valve 7 is turned to a position to close the flow of solvent through pipe 6 and to place air line 3 in direct communication with pipe 8. Air under high pressure then flows through hose 20 and Y-fitting 24 to the galley lines, bearings, oil pump and screen to force the solvent through them, the solvent entering the crank case and flowing therefrom through its drain opening. This first stage of the cleaning operation is repeated by effecting flow of solvent and air alternately until the solvent escaping from the crank case appears to be substantially free from contaminants.

For the next stage of cleaning, crank case plug 37 is replaced, and the crank case is supplied with two or three gallons of solvent through the usual oil filling opening. With Y-fitting 24 still attached to opening 43, valve 7 is again turned to a position to cause solvent to flow from tank 1 through the oil galleys to and into the bearings connected to them, and, when this has been continued for about a half minute, valve 7 is turned to a position to close the connection between pipe 8 and pipes 3 and 6. Thereafter, the vacuum control valve 19 is turned to apply suction to the oil galleys and bearings through Y-fitting 24 and pipes 21 and 17, the latter of which is connected to vacuum tank 10 which in turn is connected through pipe 11 to vacuum pump 12 which is continuously driven. The suction thus applied, withdraws solvent previously supplied through the galleys to the bearings, the solvent thus being withdrawn being discharged through pipe 17 into vacuum tank 10. Each application of suction is continued until, by observation of transparent pipe section 18, little or no solvent is seen to flow through pipe 17 to vacuum tank 10. The alternating application of solvent under pressure and its withdrawal by suction is repeated until by observation through section 18 the solvent appears to be substantially free from contaminants. In this stage of the cleaning, some solvent is withdrawn from the crankcase through the oil screen 38 that is then submerged in solvent.

Figure 4:
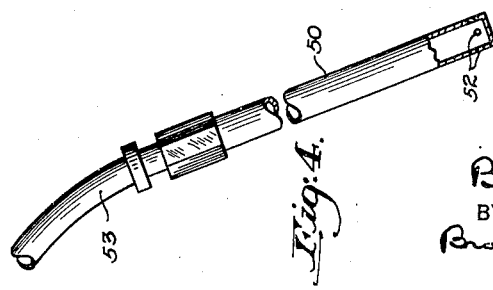

As has been explained, during the second cleaning stage a mist of solvent is maintained around the exterior of the bearings to seal them. For this purpose a small pipe 50 is inserted through a gauge rod opening and lowered therein until its end lies immediately below the surface of the solvent in the crank case. As shown in Fig. 4, the lower end of pipe 50 is closed, and its wall near its lower end is provided with a plurality of small upwardly inclined openings 52. The upper end of pipe 50 is connected by a flexible hose 53 to the compressed air line 3 shown in Fig. 3, flow through pipe 53 being controlled by a valve 54. By opening valve 54 to permit air to flow through hose 53, pipe 50 and the openings 52 at its lower end, a dense mist or spray of atomized solvent is formed and maintained in the crank case. It has been found that this mist of solvent so seals the exposed ends of the bearings that during the intermittent suction operations substantial quantities of air are not drawn through the bearings to destroy the effect of the suction applied to the solvent. As the level of the solvent in the crank case is lowered by its atomization, pipe 50 is lowered to maintain its lower end immediately below the surface of the solvent. The necessity for such lowering from time to time can readily be determined by listening to the atomizing action.

In the internal cleaning of engine bearings according to this invention I have found that during the second stage of alternately and repeatedly supplying solvent and withdrawing it by suction, it is possible to remove small particles of contaminants from bearings that can not be removed by forcing solvent in one way through the bearings, and I have also found that the second stage of cleaning is materially increased in its effectiveness by maintaining a mist of solvent in the crank case around the bearings to seal them during the suction operations.

As has been explained, the piston oil rings and the adjacent faces of the pistons and cylinders can be effectively cleaned in the manner that has been explained with reference to the cleaning of the bearings. Each cylinder is cleaned separately while its piston on the compression stroke is at its uppermost position in the cylinder as shown in Fig. 2. For cleaning a cylinder, piston and the oil ring on the piston, the spark plug 65 of the cylinder is removed and Y-fitting 24 is attached to the spark plug opening 66 through a suitable adapter. The procedure for cleaning each cylinder is then the same as that which has been explained with reference to the cleaning of the bearings.

In the internal cleaning of an engine according to this invention the engine is idle. Accordingly, relatively strong and effective solvents may be used without liability of such impairment of bearings as might result if the engine were running. The cleaning is facilitated if done while the engine is warm because the lubricating oil then flows more freely and the action of the solvent is more rapid.

According to the provisions of the patent statutes, I have explained the principle and mode of operation of my invention and have illustrated and described apparatus whereby it may be practiced. However, I desire to have it understood that, within the scope of the appended claims, the invention may be practiced otherwise than as specifically described, and by the use of apparatus other than that shown.

I claim:

1. The method of internally cleaning bearings of an internal combustion engine which is equipped with a crank case that normally contains lubricating oil and an oil screen and which is also equipped with a galley line through which oil is pumped from the crank case through the screen to the engine bearings, comprising repeatedly forcing bodies of a solvent in liquid form through the galley line into the engine bearings and screen, applying air pressure through the galley line to each such body of solvent to force it through the bearings and through the screen into the crank case, and thereafter repeatedly supplying the galley line with a solvent in liquid form under pressure to force it in one direction into the bearings and applying suction to the galley line after each such application of solvent to withdraw it from the galley line in the opposite direction.

2. The method of internally cleaning bearings of an internal combustion engine which is equipped with a crank case that normally contains lubricating oil and which is also equipped with a galley line through which oil is pumped from the crank case to the engine bearings, comprising repeatedly forcing bodies of a solvent in liquid form through the galley line into the engine bearings, applying air pressure through the galley line to each such body of solvent to force it through the bearings and into the crank case, thereafter repeatedly supplying the galley line with a solvent in liquid form under pressure to force it in one direction into the bearings and applying suction to the galley line after each such application of solvent to withdraw it from the galley line in the opposite direction, and during such withdrawal of solvent maintaining a mist of solvent in the crank case around the exterior of the bearings to seal them during said solvent withdrawal.

3. The method of internally cleaning the bearings of an internal combustion engine having an oil galley line through which lubricating oil is supplied to such bearings, comprising repeatedly supplying the galley line with a solvent in liquid form under pressure to force it in one direction into the bearings, and after each such application applying suction to the galley line to withdraw in the opposite direction solvent so supplied to it, and maintaining a mist of oil solvent around the exterior of the bearings to seal them during said withdrawal of solvent.

4. The method of internally cleaning parts of an internal combustion engine that bear upon and move with relation to each other and which are supplied with a lubricant during the operation of the engine, comprising repeatedly supplying such bearing parts with a solvent in liquid form under pressure to force it in one direction between them, after each such application applying suction to such parts to withdraw in the opposite direction solvent so supplied to them, and maintaining a mist of solvent around said parts to seal them during said withdrawal of the solvent.

5. The method of internally cleaning bearings of an internal combustion engine which is equipped with a crank case that normally contains lubricating oil and an oil screen and which is also equipped with a galley line through which oil is pumped from the crank case through the screen to the engine bearings, comprising repeatedly forcing bodies of a solvent in liquid form through the galley line into the engine bearings and screen to clean the screen, and thereafter repeatedly supplying the galley line with a solvent in liquid form under pressure to force it in one direction into the bearings and applying suction to the galley line after each such application of solvent to withdraw it from the galley line in the opposite direction.

BELDEN H. EATON.

REFERENCES CITED

The following references are of record in the file of this patent:

UNITED STATES PATENTS

| Number | Name | Date |
|---|---|---|
| 764,900 | Schalt | July 12, 1904 |
| 1,635,115 | Deutsch et al. | July 5, 1927 |
| 1,766,847 | Tibbetts | June 24, 1930 |
| 1,887,985 | Auker et al. | Nov. 15, 1932 |
| 1,918,048 | Marxman | July 11, 1933 |
| 2,222,516 | Powell et al. | Nov. 19, 1940 |
| 2,366,073 | Vallerie | Dec. 26, 1944 |
| 2,380,604 | Melton | July 31, 1945 |

FOREIGN PATENTS

| Number | Country | Date |
|---|---|---|
| 20,552 | Australia | Dec. 11, 1929 |